W. AND R. A. CASWELL.
TANDEM HITCH MECHANISM FOR HARVESTERS, TRACTORS, AND THE LIKE.
APPLICATION FILED DEC. 11, 1919.
1,365,376.
Patented Jan. 11, 1921.
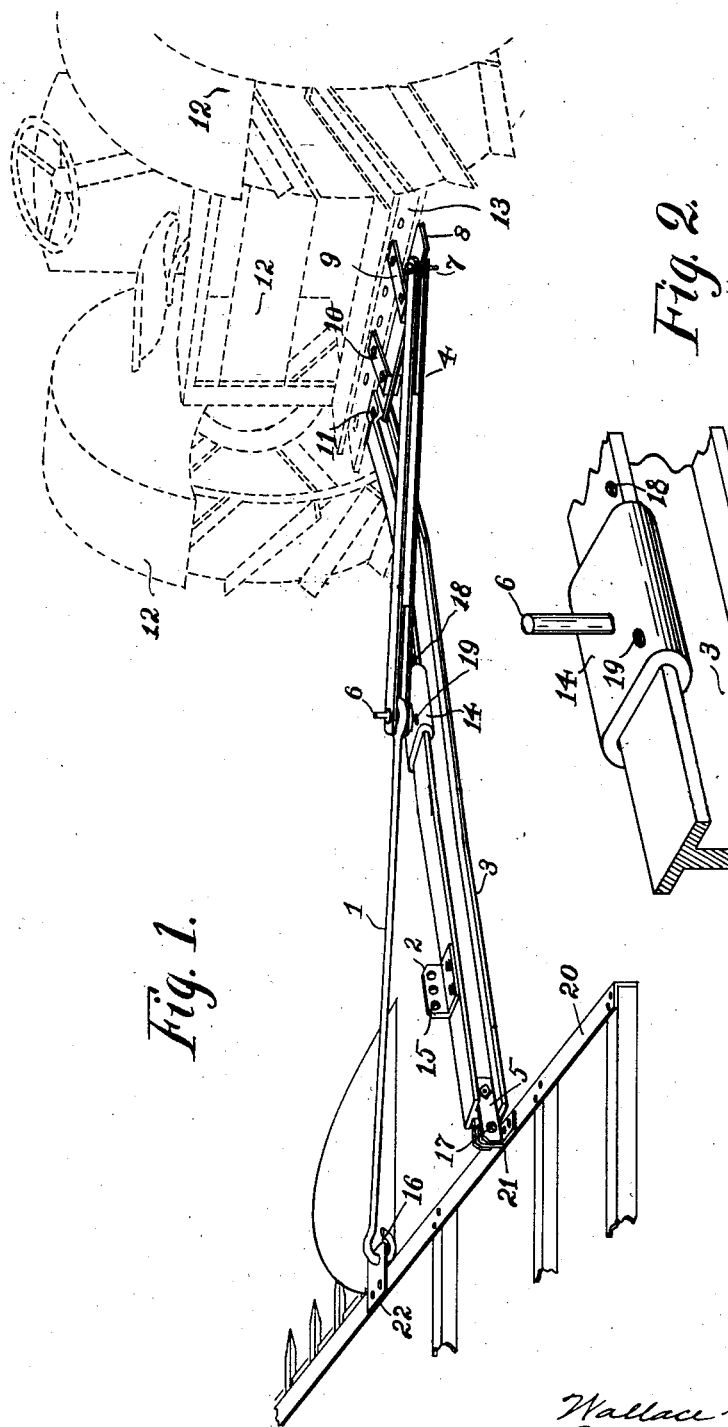
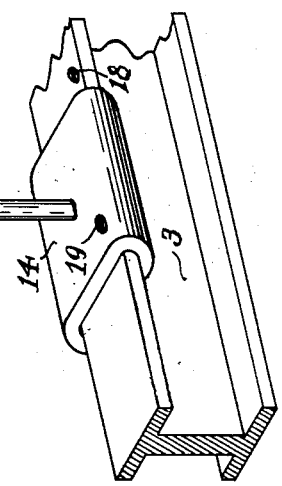
Inventors.
Wallace Caswell
Richard A Caswell
by Chas. J. O'Neill
attys.

UNITED STATES PATENT OFFICE.

WALLACE CASWELL AND RICHARD ANDREW CASWELL, OF CHEROKEE, IOWA.

TANDEM HITCH MECHANISM FOR HARVESTERS, TRACTORS, AND THE LIKE.

1,365,376.    Specification of Letters Patent.    Patented Jan. 11, 1921.

Application filed December 11, 1919. Serial No. 344,188.

*To all whom it may concern:*

Be it known that we, WALLACE CASWELL and RICHARD A. CASWELL, of Cherokee, Iowa, have invented certain new and useful Improvements in Tandem Hitch Mechanism for Harvesters, Tractors, and the like, of which the following is a specification.

This invention relates to improvements in hitches or coupling devices for use in connection with farming machinery of the vehicle type, particularly harvesters and the like, wherein it is desired to connect said vehicles in tandem offset relation one to the other, or to a tractor in offset relation, so that each element being drawn will work upon an area adjacent to that which was worked upon by the preceding element.

Another object of the invention is to provide a device of this character, strong and simple in construction, and which will automatically operate so that the harvester or the like will turn a square corner, while being drawn by the tractor without skipping a portion of the field or running down the grain in the operation of making a turn, which would be the case if the harvester was connected to a tractor in the usual manner.

To illustrate the invention a harvesting machine has been used for an example, in connection with a tractor, but it is obvious that the invention is applicable to other machines in which the tandem or offset working arrangement is desired, as for instance, plows, disks, mowers, wagons, etc.

Briefly stated, the invention comprises a draw bar forming the main connection between the vehicles or elements and a cross reach consisting of two members with their outer ends also forming connections between the vehicles, and having their inner ends pivotally connected to a carriage or shoe slidably positioned on the main draft bar.

In accompanying drawings:

Figure 1 illustrates in perspective a view of the complete device as applied to a tractor and a harvester or the like.

Fig. 2 is a detail view showing means of positioning the carriage or shoe for sliding engagement with the main draw bar and means for locking said carriage to the draw bar when desired.

Referring to the drawings in detail, the tractor 12 which is provided with the usual draw bar 13 is connected to a cross evener 8 preferably by links 9 and 10. To one end of cross evener 8, which, for the purpose of description in this instance we will call the left hand end of said evener, by a connection 11, is secured the forward end of the main draft bar 3. The other or after end of this main draft bar is pivotally connected through clips 5 and pivot 17 to the frame member 20 of the harvester by a bracket 21. It is necessary that this connection should not only allow for a vertical movement of the draft bar 3, which is taken care of by the pivot 17, but should also allow for more or less play thereof in a horizontal direction. This is provided for in a very simple and effective manner by flaring the outer ends of the clips 5, allowing sufficient play between said clips, and also by making the holes for the pivot 17, larger than the pivot bolt, to further permit this horizontal play of the draft bar. It will be here noted that while the forward end of the draft bar is secured substantially to the left side of the tractor the after end is connected to the right side of the frame member of the harvester.

Extending diagonally across the draft bar 3 is a cross reach comprising connecting rods 1 and 4. The rear end of the connecting rod 1 is secured by a hook 16 and a bracket 22 to the left hand side of the frame member 20. The forward end of the connecting rod 4 is pivotally secured at 7 to the right hand end of the cross evener 8. The rear end of the connecting rod 4 and the forward end of the connecting rod 1 are connected together and at the same time secured to a carriage 14 by a pivot pin 6 formed on the carriage. This carriage 14 is positioned for forwardly and rearwardly sliding engagement on the main draft bar 3.

Secured to the upper face of the draft bar 3 is a clip 2 provided with holes 15 for the purpose of attaching, if necessary, the tilting levers of the harvester.

During the operation of the device the carriage 14 will ride back and forth on the main draft bar 3 but there may be times when it would be desired to secure this carriage against such sliding movement. For this purpose I have provided a hole 18 in the draft bar 3 and a hole 19 in the carriage 14 through which a pin may be inserted when these holes are registered.

In operation, when the tractor 12 is driven forward in a straight line, the harvester 20 would follow in an offset relation, but when the tractor reaches the point at which it is desired to turn a square corner to the left the outward end of the evener 8 will describe an arc of a larger circle than the inward end of said evener, whereupon the connecting rod 4 will cause the carriage 14 to slide forward on the member 3, and in turn the connecting rod 1 will pull the inward end, or the left hand side, of the frame member 20 of the harvester forward, more rapidly than the outward or right hand side of said frame member. This will cause the harvester to move forward in a straight line while the tractor is turning to the left. After the tractor has turned sufficiently to round the corner, which is approximately 90 degrees on a square field, the steering wheel is turned sharply to the right which squares the tractor up parallel to the side of the field and the outward or right hand end of the evener 8 at the point 7 will move rearwardly in relation to the inner or left hand end at the point 11. The connecting rod 4 will now cause the carriage to slide rearwardly, which motion acting through connecting rod 1 forces the inner end of the frame member 20, at 22, rearwardly in relation to the outward end of said frame member at 21. This motion kicks back the "ground wheel" of the harvester sufficiently to cause the harvester to turn a square corner.

For road travel and for going through gates, etc., it is desirable that the harvester trails directly behind the tractor, and not in an offset relation. To accomplish this the carriage 14 is moved forwardly on the draft bar 3 until the hole 19 registers with the hole 18. The pin 7 is then removed and placed in these corresponding holes which makes the rear portion of the draft mechanism rigid and releases the forward end of the connecting rod 4. The harvester will now be drawn directly by the draft bar 3 from the pivot point 11.

The invention has been illustrated and described for use in connection with left hand harvesters or, in other words, with harvesters that turn to the left in cutting around the field. Obviously this same mechanism could be used for right hand harvesters by merely attaching the forward end of the draft bar 3 at 7 and moving the connecting rod 1 across to the opposite side of said draft bar.

What we claim is:

1. A draft connection for harvesters and the like, comprising a main draft bar, a cross-reach consisting of two members cooperating with said main bar, a carriage slidably positioned on the main bar, a pivotal connection between said carriage and the adjoining portions of said cross-reach members, means for disconnecting one of said cross-reach members, and coöperating means on the main bar and carriage for locking the inner end of the other cross-reach member to said main bar.

2. A draft connection for harvesters and the like, comprising a main draft bar, a carriage slidably positioned on said main bar, a cross reach consisting of two members cooperating with the main bar and carriage, and means carried by said carriage for pivotally connecting the inner ends of the two cross reach members, to said carriage.

3. A draft connection for harvesters and the like, comprising a main draft bar, a cross reach coöperating with said main bar, a carriage slidably positioned on the main bar, a pivotal connection between said carriage and the intermediate portion of said cross reach and means carried by the outer ends of the main bar and cross reach for establishing the necessary coupling connections between the drawing vehicle and the vehicle to be drawn.

4. A draft connection for harvesters and the like, comprising a main draft bar and cross reach, a cross evener adapted to be secured to a tractor or other vehicle, the main bar having one end pivotally secured to one end of said evener with its other end pivotally attached to the forward portion of the following vehicle and to one side of the center thereof, the other end of the cross evener having attached thereto one end of the cross reach, the other end of the cross reach being attached to the following vehicle at a point suitably spaced from the point of attachment of the main bar, and the intermediate and intersecting portions of the main bar and cross reach connected by a carriage slidably supported on said main bar.

In testimony whereof we affix our signatures, in the presence of two witnesses.

WALLACE CASWELL.
RICHARD ANDREW CASWELL.

Witnesses:
S. B. CHAMPION,
MARTHA AMENT.